United States Patent
Stemple

(10) Patent No.: US 11,395,959 B2
(45) Date of Patent: Jul. 26, 2022

(54) GLASSES CASE AND SYSTEM

(71) Applicant: Sony Interactive Entertainment Inc., Tokyo (JP)

(72) Inventor: Lloyd Preston Stemple, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/952,304

(22) Filed: Nov. 19, 2020

(65) Prior Publication Data
US 2021/0162297 A1 Jun. 3, 2021

(30) Foreign Application Priority Data

Nov. 29, 2019 (GB) ........................................ 1917440

(51) Int. Cl.
| | |
|---|---|
| *H04M 1/00* | (2006.01) |
| *A63F 13/24* | (2014.01) |
| *A63F 13/211* | (2014.01) |
| *A63F 13/235* | (2014.01) |
| *H04W 4/80* | (2018.01) |
| *G06F 3/01* | (2006.01) |

(Continued)

(52) U.S. Cl.
CPC ............ *A63F 13/24* (2014.09); *A63F 13/211* (2014.09); *A63F 13/235* (2014.09); *G06F 3/011* (2013.01); *G06F 3/14* (2013.01); *H04B 1/02* (2013.01); *H04B 1/06* (2013.01); *H04W 4/80* (2018.02); *A63F 13/213* (2014.09); *A63F 13/285* (2014.09); *A63F 2300/105* (2013.01); *A63F 2300/1031* (2013.01); *A63F 2300/1037* (2013.01); *A63F 2300/1043* (2013.01); *A63F 2300/1087* (2013.01)

(58) Field of Classification Search
CPC ......... A45C 11/04; G02C 11/10; H02J 7/0044
See application file for complete search history.

(56) References Cited

U.S. PATENT DOCUMENTS

2007/0281752 A1* 12/2007 Lewis .................... G02C 11/10
455/569.1
2010/0105475 A1 4/2010 Mikhailov
(Continued)

FOREIGN PATENT DOCUMENTS

| | | |
|---|---|---|
| EP | 3827888 A1 | 6/2021 |
| WO | 2018172826 A1 | 9/2018 |

OTHER PUBLICATIONS

Extended European Search Report for corresponding EP Application No. 20205774.1, 10 pages, dated Mar. 31, 2021.
(Continued)

*Primary Examiner* — Lawrence S Galka
(74) *Attorney, Agent, or Firm* — Matthew B. Dernier, Esq.

(57) ABSTRACT

A glasses case for a pair of glasses that in turn includes an integral display, the glasses case including a housing, where the housing encloses a volume in which the glasses are to be stored; and a battery operably coupled to a power access unit from which the glasses, when stored in the housing volume, can draw power; and where the housing of the glasses case includes, on the outer portion thereof, user control inputs laid out in a configuration similar to, and operational as, a conventional handheld videogame controller, and adapted to provide inputs to a computing system driving the integral display of the glasses.

15 Claims, 1 Drawing Sheet

(51) Int. Cl.
*G06F 3/14* (2006.01)
*H04B 1/02* (2006.01)
*H04B 1/06* (2006.01)
*A63F 13/213* (2014.01)
*A63F 13/285* (2014.01)

(56) References Cited

U.S. PATENT DOCUMENTS

| | | |
|---|---|---|
| 2011/0221656 A1 | 9/2011 | Haddick |
| 2018/0090958 A1* | 3/2018 | Steger .................. H02J 7/0047 |
| 2019/0033622 A1 | 1/2019 | Olgun |

OTHER PUBLICATIONS

Combined Search and Examination Report for corresponding GB Application No. GB1917440.8, 6 pages, dated Apr. 28, 2020.
Examination Report for corresponding GB Application No. 1917440.8, 3 pages, dated Feb. 23, 2022.

* cited by examiner

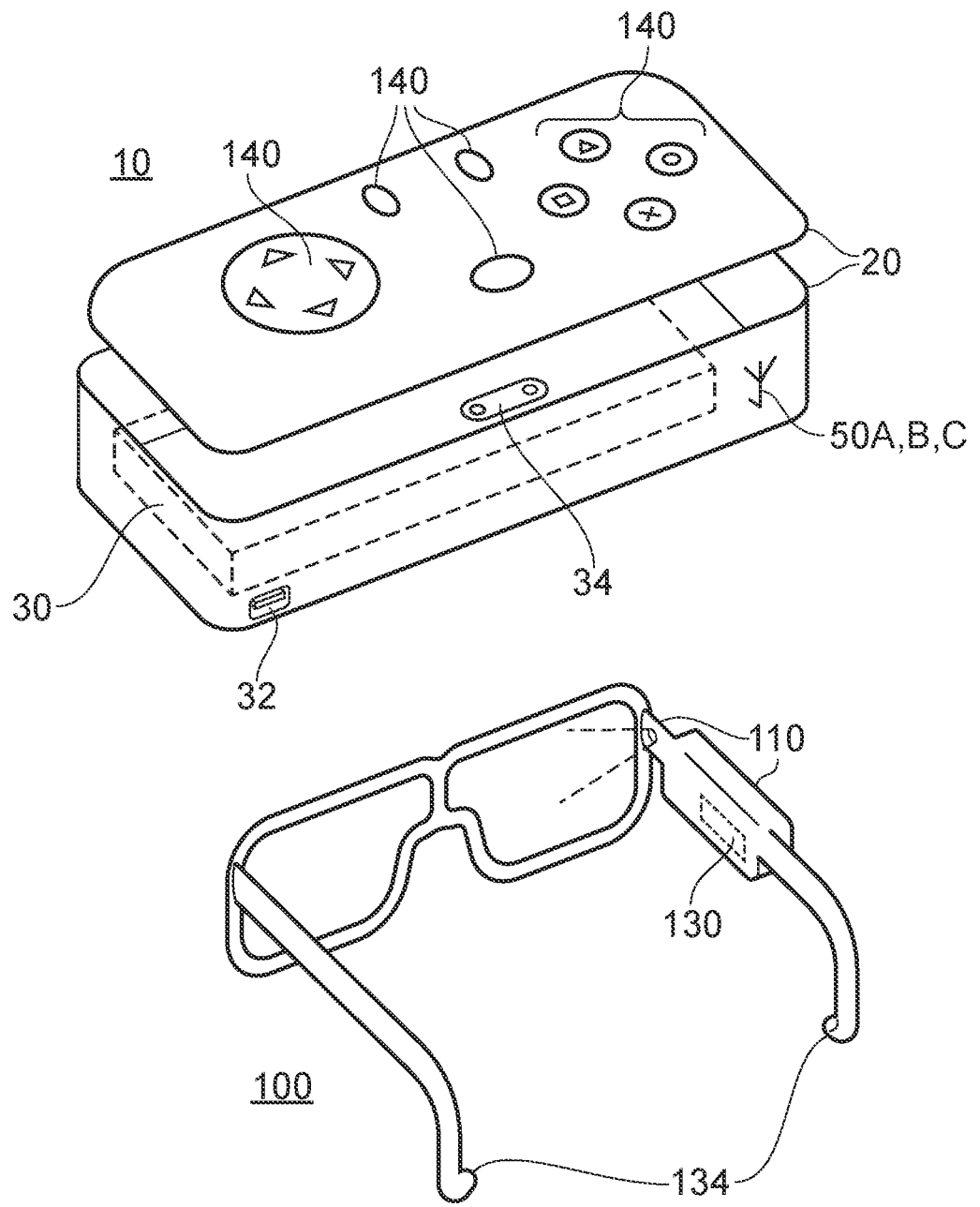

GLASSES CASE AND SYSTEM

BACKGROUND OF THE INVENTION

Field of the Invention

The present invention relates to a glasses case and system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional glasses cases are intended to provide physical storage and security for the glasses they hold (for example, reading glasses or distance glasses), sometimes together with storage for accessories such as a cleaning cloth.

However, recently glasses have been developed comprising an integrated display, either to provide an augmented or mixed reality experience for the user when the glasses are transparent, or a virtual reality experience if the glasses are opaque.

There is a need for a glasses case better suited to such integrated display glasses.

The present invention seeks to mitigate or alleviate such a need.

SUMMARY OF THE INVENTION

In a first aspect, a glasses case is provided.

In another aspect, a system is provided.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawing, wherein:

FIG. 1 is a schematic diagram of a glasses case and glasses comprising an integral display, in accordance with embodiments of the present description.

DESCRIPTION OF THE EMBODIMENTS

A glasses case and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring now to the drawings, wherein like reference numerals designate identical or corresponding parts throughout the several views, in an embodiment of the present disclosure, a glasses case 10 is provided as shown in FIG. 1. The case comprises a housing 20, which is typically a rigid shell providing physical protection for the glasses 100 stored therein. The housing may be made of any suitable material, including metal or plastic, and may have a decorative outer layer.

The glasses case housing can have any suitable form factor for accommodating a pair of glasses, for example being hinged like a clam shell to open for access, or having an openable opening at one end to allow the glasses to be inserted or removed.

Hence the housing encloses a volume in which the glasses are to be stored.

As noted previously, the glasses 100 comprise an integral display 110. This display may take any suitable form, and may be intended for augmented reality (AR) or mixed reality (MR) use (where the lenses may be at least in part see-through), or for virtual reality (VR) or mixed reality use (where the lenses may be opaque). The display is integral at least to the extent that it is mounted on the glasses during use, although in embodiments it may be removable, e.g. to facilitate cleaning or transfer to different glasses (e.g. if the user has a change of prescription for a lens).

Non-limiting examples of a display include a projector mounted onto an arm (as shown), bridge or frame of the glasses that projects an image onto the glass of a respective lens of the glasses, or an image source mounted on an arm, bridge or frame of the glasses whose image is transferred onto or into the lens of the glasses by a light guide, or a display panel in front of or in lieu of a respective lens of the glasses, or light emitting elements integrated into a respective lens of the glasses.

The glasses may comprise a respective display for one lens or each lens. References herein to a display may thus encompass one or two displays unless specified otherwise.

In addition, the glasses case comprises a battery 30. The battery is typically but not necessarily rechargeable from within the case. The battery is typically located in the housing, beneath the volume in which the glasses may be stored (e.g. between a lower portion of the volume and a notional bottom of the housing/glasses case). The notional 'top' and 'bottom' of the glasses case are discussed in more detail later herein.

If the battery is not rechargeable within the case, typically an access panel (not shown) is provided to allow the removal and replacement of the battery. The battery may comprise a plurality of separate cells (as a non-limiting example, two, three or four AA or AAA cells which themselves may be rechargeable via a separate charger).

If the battery is rechargeable within the case, an access panel (not shown) may still be provided for removal and replacement of the battery (for example to extend use when a battery is depleted and a charging source is not available, or to replace a battery that no longer holds charge). In addition, a charging unit 32 is provided, such as for example a micro-USB® or USB-C® port or proprietary electrical contacts or a wireless induction point, coupled to circuitry to provide a charge to the battery to recharge it.

In any event, the battery may then provide charge to the power source of the glasses when these are stored in the case. As such, the glasses case operates as a power bank for AR, MR or VR glasses stored in it. The power source of the glasses is typically a rechargeable battery 130 integral to the glasses (or the image source of the glasses). Optionally, the battery of the glasses case may provide power for the glasses in use, e.g. via a power line, although this is not preferred.

In the case where the battery of the glasses case charges a power supply of the glasses themselves, the battery is operably coupled to a power access unit 34 from which the glasses, when stored in the housing volume, can draw power.

In one embodiment, the power access unit is positioned to physically couple with a power receiving unit 134 of the glasses when the glasses are positioned within the glasses case. For example, the coupling unit may be a micro-USB or USB-C plug, or a proprietary plug, that physically couples with a socket of the glasses. For example, when the glasses are folded for insertion into the storage volume of the glasses case, a folded arm may reveal a socket previously hidden flush to the frame of the glasses, and this may engage with the plug in the case.

It will be appreciated that the socket may be positioned anywhere on the glasses that is suitable, e.g. so that it does not interfere with operation and wearing of the glasses, but can couple to the power access unit when stored in the storage volume of the glasses case.

It will also be appreciated that whilst the above example refers to the plug in the case and the socket on the glasses, this may be reversed so the plug is on the glasses and the socket is in the case, or neither may comprise a plug or socket as such but rather electrical contacts at one or more predetermined corresponding positions. Hence for example the socket may equivalently be contacts, for example at the ends of the arms of the glasses, as shown. The plug, socket or contacts, together with appropriate charging circuitry coupled to the battery of the glasses, then forms the power receiving unit 134.

In another embodiment, the power access unit 34 comprises an induction unit (not shown) positioned to wirelessly couple with a power receiving unit 134 of the glasses when the glasses are positioned within the glasses case. In this case, the power source of the glasses is thus charged using wireless/induction charging. For example, the power receiving unit of the glasses may be embodied within an arm of the glasses or around a lens frame of the glasses, with the power access unit being located in a corresponding position in the glasses case.

Furthermore, the glasses case comprises one or more user control inputs adapted to provide inputs to a computing system driving the integral display of the glasses.

Typically the housing of the glasses case comprises one or more such user control inputs on an outer portion thereof; this and alternative and additional layouts are described in more detail later herein.

As can be seen from FIG. 1, the glasses case may thus resemble, and operate as, a hand-held controller such as may be used with a videogame console.

The glasses case may be held, for example in two hands, with the longitudinal axis of the case laying between the hands, and the ends of the case resting in the palm of each hand. The user's thumbs may then access a notional top surface of the glasses case on which one or more control inputs are placed. Meanwhile the user's $3^{rd}$ through $5^{th}$ fingers may support a notional bottom surface, whilst the user's index fingers may naturally rest on the notional outer edge (the part of the side of the glasses case facing away from the user), and the area on the side of the glasses where the index fingers naturally rest may be referred to as the so-called 'shoulders' of the glasses case.

Hence the glasses case may be held by a user in a manner similar to a conventional handheld videogame controller.

As noted previously herein, the battery of the glasses case may be located in a bottom part of the glasses case (for example between the lower surface of the storage volume and the notional bottom of the glasses case) so that the centre of gravity of the glasses case is in the lower part of the case. This generally makes the case more comfortable to hold and manipulate.

The user control inputs may be positioned anywhere on the glasses case, for example in a configuration similar to a conventional handheld videogame controller such as a Sony DualShock 4® controller.

Accordingly, the user control inputs may comprise one or more of the following, which represents a non-limiting and non-exhaustive list of user control inputs.

- a joystick, for example mounted on a top surface of the glasses case.
- a joypad, which typically provides similar functionality and inputs as a joystick, but is typically flatter and hence more may be preferable on a glasses case that is to be stowed in a pocket or bag.
- a touchpad, again for example typically provided on a top surface of the glasses case, and which may provide gestural inputs or mouse/reticule control.
- a button, for example a software-definable button whose function may be application specific.
- a set of directional buttons; these may operate in a manner similar to a joypad, but comprise separate buttons.
- a set of function buttons; these may comprise a predetermined set of input buttons whose operations may vary with application, but which may adhere to a conventional input grammar by virtue of being in a predetermined configuration. An example of these are the cross, triangle, square and circle buttons on a PlayStation® controller.
- a system access button; typically such a button interrupts a current application to access an underlying operating system, or may be used to provide status information, such as power reserves of the glasses and/or the battery of the glasses case.
- an option button; typically this is used to provide access to application-specific options, such as in-game menus, or saving/loading game states or application documents, etc.
- a trigger; typically a trigger is located in the shoulder region of the glasses case and is activated by the user's index finger. A trigger may have a variable input responsive to the extent to which it is pressed.
- a shoulder button, which like the trigger may be located in the shoulder region of the glasses case and activated by the user's index finger.

The housing of the glasses case may comprise holes or other spacings to accommodate such user control inputs as needed, and/or user control inputs may be positioned on the outside of the housing (for example between the protective shell of the housing and a decorative cover), or a mixture of these approaches may be used.

Optionally the buttons may be only electrically linked so as to provide input signals by use of a switch or other means of activation, for example mounted within the storage volume of the glasses case, or by connecting logic operable to activate the inputs in response to an activation signal, such as a BlueTooth® signal, from the glasses themselves. This helps to avoid accidental inputs and also unnecessary power drain, for example when the glasses case is being stored in a bag or pocket.

Alternatively or in addition, user control inputs may be provided inside the glasses case; for example one or more joysticks, joypads, or buttons as described previously herein may be provided within the internal storage volume of the glasses case. These may, for example, sit on peripheral areas of the internal casing or on the bottom surface of the storage area or other moulded areas of the case that fit around the space where the glasses are stored; it will be appreciated that the lenses of the glasses will be raised from the bottom surface due to the folded arms, and so there is scope for controls to be mounted on this bottom surface beneath them. Similarly a system access button, for example, could be accommodated on the empty area below the bridge of such glasses.

Meanwhile optionally some user control inputs such as shoulder buttons may still be outside. Optionally such controls may only be mechanically or electrically linked to operate as user control inputs when the glasses case is opened.

Further alternatively or in addition, the glasses case may have a dual-lid; the outer lid provides physical protection in the manner of a conventional glasses case but can be opened to reveal an inner lid comprising controls as described previously herein. This inner lid (or the combined inner and outer lids) can then be opened to reveal the storage volume for the glasses.

In embodiments of the description, in addition to the one or more user control inputs described above, the glasses case may also comprise one or more motion detection units. These may for example comprise one or more accelerometers or gyroscopes such as may be found in conventional handheld videogame controllers, and may used for a similar purpose. The motion detection unit(s) may also be used to detect when the glasses case is being held in an operational position. Similarly, if motion detection units are located in both the top and bottom halves of a clamshell style glasses case, it is possible to detect when the glasses case is open or closed (alternatively this may be detected using a separate detection mechanism, if required).

Similarly, in embodiments of the description, the glasses case may comprise a haptic feedback unit, such as a motor driving an asymmetrically mounted weight. This may be used to make the glasses case vibrate in response to events within an application driving the display of the glasses, and/or in response to events within the glasses case (e.g. glasses case has opened, glasses stored therein are now fully charged, or recharged to a predetermined extent, battery in the glasses or the glasses case is low, etc).

In embodiments of the description, in addition to the one or more user control inputs described above, the glasses case may also comprise a light having a predetermined shape. The light is typically positioned on a side of the glasses case facing away from the user when the case is being held for use as a handheld controller. The light may correspond to a light found on a conventional controller for a videogame console, such as for example the light found on the front side of a DualShock 4® controller, which resembles a flat/squat inverted triangle with rounded corners. Equivalently, the light may comprise a constellation of lights in a predetermined arrangement.

The light may be used as part of a wider system optionally comprising a remote processor and a video camera operable to track the light within captured video of a scene encompassing the glasses case (for example during use by the user).

In embodiments of the description, the glasses case comprises a collision detection unit. The collision detection unit is again typically positioned on a side of the glasses case facing away from the user when the case is being held for use as a handheld controller. The collision detection unit may operate in a similar manner to an infra-red tape measure comprising a light emitter and sensor, by determining the round-trip time for a sequence of light pulses and from this an estimate of the distance to the surface that reflected the light. If the distance is less than a predetermined threshold, then an alert is triggered (for example a haptic response from the glasses case, or a message displayed by the glasses display.

Such a collision detection mechanism may be of use when the AR, MR or VR glasses serve to wholly or partially obscure the environment in front of the user.

Hence in summary, the glasses case acts as a means to store and recharge glasses with an integral display, and also provide inputs to an application driving that display.

The application is typically run on a computing system. In embodiments of the present description, this computing system may either be included within the glasses case, or may be included within a remote device, or the role of the computing system may be shared between computing systems in both the glasses case and a remote device.

The remote device may for example be a mobile phone, tablet, digital assistant, set-top box, PC, videogame console or the like, which thus operates as a remote computing system.

In the event that the computing system is included in the glasses case, the computing system typically also draws power from the battery 30. In addition, the glasses case comprises a short-range wireless transmitter 50A adapted to transmit display instructions to the glasses when in use. The transmitter may for example adhere to a known communications standard such as Bluetooth® or WiFi® direct, or may be proprietary. Such short range wireless transmitters typically operate up to a range of 10 or 20 metres.

In the event that the computing system is a remote computing system in a remote device, then the glasses case comprises a short-range wireless transmitter 50B adapted to transmit inputs received from the one or more user control inputs to the remote device. Again the transmitter may for example adhere to a known communications standard such as Bluetooth® or WiFi® direct, or may be proprietary. The short-range wireless transmitter may replicate the functionality of a handheld videogame controller that uses a similar short-range wireless transmission scheme.

In the event that functions of the computing system are shared between a computing system of the glasses case and a remote computing system, then the glasses case again comprises a short-range wireless transmitter 50C adapted to transmit data relevant to the handover of functions of processing sequences as required. Again the transmitter may for example adhere to a known communications standard such as Bluetooth® or WiFi® direct, or may be proprietary. It will be appreciated that transmitters 50A, B, C may affect all be the same physical transmitter, transmitting respective signals according to the functionality of the glasses case.

It will be appreciated that in any of the above cases, the transmitter may equivalently be a transceiver operable to also receive data back from the glasses and/or remote computing system.

In embodiments of the present description, a system comprises the glasses case as described herein, together with a pair of glasses comprising an integral display also as described herein.

Hence a user may carry their AR, MR or VR glasses in the case so that when the user wishes to use them they are charged and the user can control the application driving the glasses using the user control inputs accessible on the glasses case.

In an instance where the glasses case comprises the computing system, the glasses case and glasses are typically paired so as to avoid cross-talk with any other devices within radio range.

Optionally in such an instance, the system also comprises remote terminal such as a mobile phone, tablet, videogame console or the like as described previously herein, and the remote mobile terminal is operable to communicate with the computing system in the glasses case.

This may be useful, for example, to provide mobile internet access via a mobile phone, or to provide a large storage source for games or other media via a PC or console.

In another instance, the system comprises a remote terminal operable as the computing system. Again the remote terminal may be a mobile terminal such as a mobile phone or tablet, or a stationary terminal such as a PC or videogame console. Potentially, the remote terminal may be part of the glasses themselves.

In such an instance, the remote terminal comprises a receiver adapted to receive the inputs transmitted from the glasses case. As described previously herein, such communication may be for example via Bluetooth®, Wifi Direct®, or a proprietary scheme. Similarly, communications with the glasses case may be two-way (for example to control a light or haptic feedback, if included).

In such an instance, the remote terminal comprises a transmitter adapted to transmit display instructions to the glasses when in use.

In such an instance, again the glasses case and remote terminal are typically paired, as are the remote terminal and glasses (unless already part of the glasses), to prevent cross-talk.

Hence in embodiments of the present disclosure, a glasses case is provided that is adapted to charge a pair of glasses comprising an integrated display whilst they are stored in the case, and is also adapted to provide user control inputs to the computing system that drives the glasses display. In some embodiments, this computing system is integral to the glasses case and/or the glasses themselves, making a system comprising the glasses case and the glasses a self-contained AR, MR and/or VR gaming system. In other embodiments, this computing system is part of a remote terminal such as a mobile phone, making the glasses case and glasses a combined peripheral within a system also comprising the remote terminal.

In any event, these embodiments provide a system that advantageously provides all the components needed to power and use a set of AR, MR or VR glasses in a single form factor (or in conjunction with another ubiquitous device such as a mobile phone).

This makes use of such a system more convenient and practical to the user.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A glasses case for a pair of glasses that in turn comprise an integral display, the glasses case comprising:
    a housing, wherein the housing encloses a volume in which the glasses are to be stored; and
    a battery operably coupled to a power access unit from which the glasses, when stored in the housing volume, can draw power;
    wherein the housing of the glasses case comprises, on an outer portion thereof that is external and visible regardless of whether the glasses case is open or closed, user control inputs laid out in a configuration similar to, and operational as, a conventional handheld videogame controller, and adapted to provide inputs to a computing system driving the integral display of the glasses.

2. The glasses case of claim 1, in which the power access unit comprises a coupling unit positioned to physically couple with a power receiving unit of the glasses when the glasses are positioned within the glasses case.

3. The glasses case of claim 1, in which: the power access unit comprises an induction unit positioned to wirelessly couple with a power receiving unit of the glasses when the glasses are positioned within the glasses case.

4. The glasses case of claim 1, in which the volume in which the glasses are to be stored comprises one or more user control inputs.

5. The glasses case of claim 1, in which the user control inputs comprise one or more of:
    i. a joystick;
    ii. a joypad;
    iii. a touchpad;
    iv. a button;
    v. a set of directional buttons;
    vi. a set of function buttons;
    vii. a system access button;
    viii. an option button;
    ix. a trigger; and
    x. a shoulder button.

6. The glasses case of claim 1, comprising one or more motion detection units.

7. The glasses case of claim 1, comprising a collision detection unit.

8. The glasses case of claim 1, comprising a light having a predetermined shape corresponding to a light found on a conventional controller for a videogame console and positioned on a side of the glasses case facing away from the user when the case is being held for use as a handheld controller.

9. The glasses case of claim 1, in which
    the glasses case comprises the computing system; and
    the glasses case comprises a transmitter adapted to transmit display instructions to the glasses when in use.

10. The glasses case of claim 1, in which the glasses case comprises a short-range wireless transmitter adapted to transmit inputs received from the one or more user control inputs to a remote computing system.

11. A system, comprising:
    a glasses case for a pair of glasses that in turn comprise an integral display, the glasses case comprising:
    a housing, wherein the housing encloses a volume in which the glasses are to be stored; and
    a battery operably coupled to a power access unit from which the glasses, when stored in the housing volume, can draw power;
    wherein the housing of the glasses case comprises, on an outer portion thereof that is external and visible regardless of whether the glasses case is open or closed, user control inputs laid out in a configuration similar to, and operational as, a conventional handheld videogame controller, and adapted to provide inputs to a computing system driving the integral display of the glasses; and a pair of glasses comprising an integral display.

12. The system of claim 11, comprising:

a remote mobile terminal, wherein if the glasses case comprises the computing system, the remote terminal is operable to communicate with the computing system via a short-range wireless link.

13. The system of claim 11, comprising: a remote terminal operable as the computing system.

14. The system of claim 13, in which the remote terminal comprises a short-range wireless receiver adapted to receive the inputs transmitted from the glasses case.

15. The system of claim 13, in which: the remote terminal comprises a short-range wireless transmitter adapted to transmit display instructions to the glasses when in use.

\* \* \* \* \*